(12) United States Patent
Ring (10) Patent No.: US 7,890,260 B2
(45) Date of Patent: Feb. 15, 2011

(54) NAVIGATION SYSTEM WITH MINIMAL ON-BOARD PROCESSING

(75) Inventor: Jeffrey R. Ring, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 1449 days.

(21) Appl. No.: 11/264,409

(22) Filed: Nov. 1, 2005

(65) Prior Publication Data

US 2007/0100546 A1 May 3, 2007

(51) Int. Cl.
*G01C 21/00* (2006.01)

(52) U.S. Cl. .................. 701/213; 701/200; 701/214; 701/215; 340/988

(58) Field of Classification Search ............... 701/213, 701/214, 215, 200, 220; 342/357.14, 357.06, 342/357.09, 357.12; 340/988
See application file for complete search history.

(56) References Cited

U.S. PATENT DOCUMENTS

| | | | | |
|---|---|---|---|---|
| 5,030,958 A * | 7/1991 | Schmalenberger et al. | .. | 342/358 |
| 5,184,304 A * | 2/1993 | Huddle | ...................... | 701/220 |
| 5,339,684 A * | 8/1994 | Jircitano et al. | ........... | 73/178 R |
| 5,359,889 A * | 11/1994 | Jircitano et al. | ........... | 73/178 R |
| 5,784,029 A * | 7/1998 | Geier | ......................... | 701/214 |
| 6,039,028 A * | 3/2000 | Stuntz et al. | ................. | 123/436 |
| 6,145,378 A * | 11/2000 | McRobbie et al. | ............ | 73/490 |
| 6,175,806 B1 * | 1/2001 | Thuente | ...................... | 701/213 |
| 6,246,960 B1 * | 6/2001 | Lin | ............................. | 701/214 |
| 6,292,750 B1 * | 9/2001 | Lin | ............................. | 701/214 |
| 6,298,316 B1 * | 10/2001 | Diesel | ......................... | 702/190 |
| 6,408,245 B1 * | 6/2002 | An et al. | ..................... | 701/216 |
| 6,417,802 B1 * | 7/2002 | Diesel | ................... | 342/357.31 |
| 6,560,535 B2 * | 5/2003 | Levy et al. | ................... | 701/213 |
| 6,631,323 B2 * | 10/2003 | Tucker et al. | ............... | 701/221 |
| 6,859,170 B2 * | 2/2005 | Devereux et al. | ...... | 342/357.29 |
| 6,900,760 B2 * | 5/2005 | Groves | .................. | 342/357.65 |
| 7,043,364 B2 * | 5/2006 | Scherzinger | ................ | 701/213 |
| 2001/0020216 A1 * | 9/2001 | Lin | ............................ | 701/216 |

(Continued)

OTHER PUBLICATIONS

Sukkarieh, "Low Cost, High Integrity, Aided Inertial Navigation Systems for Autonomous Land Vehicles", "Ph.D. Thesis, Australian Centre for Field Robotics", 2000, Publisher: Dept. of Mechanical Engineering, The University of Sydney, Published in: Sydney, Australia.*

*Primary Examiner*—Khoi Tran
*Assistant Examiner*—Jorge O Peche
(74) *Attorney, Agent, or Firm*—Fogg & Powers LLC (57) ABSTRACT

A navigation system that provides a position estimate. In one embodiment, a method includes integrating an acceleration estimate in each of three dimensions. Subtracting a GPS velocity in each of the dimensions from the integrated acceleration estimate in each dimension to determine a velocity noise error in each dimension. Filtering the velocity noise error in each dimension. Adding the filtered velocity noise error to the integrated acceleration estimate in each dimension to obtain a velocity estimate in each dimension. Integrating the velocity estimate in each dimension to determine an integrated velocity estimate in each dimension. Subtracting a GPS position in each dimension from the integrated velocity estimate in each dimension to determine a position noise error in each dimension. Filtering the position noise error in each dimension and adding the filtered position noise error in each dimension to the integrated velocity estimate to obtain a position estimate in each dimension.

15 Claims, 11 Drawing Sheets

U.S. PATENT DOCUMENTS

| | | | |
|---|---|---|---|
| 2002/0111717 A1* | 8/2002 | Scherzinger et al. | 701/1 |
| 2002/0143491 A1* | 10/2002 | Scherzinger | 702/160 |
| 2003/0055562 A1* | 3/2003 | Levy et al. | 701/214 |
| 2005/0065727 A1* | 3/2005 | Hu et al. | 701/214 |
| 2005/0125142 A1* | 6/2005 | Yamane | 701/200 |
| 2005/0203701 A1* | 9/2005 | Scherzinger | 701/207 |
| 2007/0016371 A1* | 1/2007 | Waid et al. | 701/213 |
| 2007/0156338 A1* | 7/2007 | Coatantiec et al. | 701/214 |
| 2009/0198444 A1* | 8/2009 | Takanashi et al. | 701/213 |

* cited by examiner

NAVIGATION SYSTEM WITH MINIMAL ON-BOARD PROCESSING

TECHNICAL FIELD

The present invention relates generally to navigation systems and in particular to a navigation system with minimal on-board processing.

BACKGROUND

Navigation systems used by vehicles such as aircraft, spacecraft, orbital vehicles, ships, motor vehicles and the like are used to determine the location or position of the vehicle with reference to the earth. A common navigational system uses global positioning satellites (GPS) that provides signals upon which a vehicle uses to estimate position and velocity. For some applications the determined GPS position and GPS velocity estimates do not provide the accuracy required due to noise factors in the GPS signals. Kalman filters have been used to increase the accuracy of the position and velocity estimates. A Kalman filter system is a computational solution for tracking a time-dependant state vector with noisy equations of motion in real time by a least square method. Kalman filters are used to separate signal from noise to optimally predict a modeled system with time. Typical Kalman filter systems are relatively complex systems that require a relatively large amount of processing power. In applications where a non-complex system is needed or where the processing power is limited, a typical Kalman filter system is not a viable option.

For the reasons stated above and for other reasons stated below which will become apparent to those skilled in the art upon reading and understanding the present specification, there is a need in the art for a relatively simple velocity and position estimate that requires relatively small processing power.

SUMMARY OF INVENTION

The above-mentioned problems of current systems are addressed by embodiments of the present invention and will be understood by reading and studying the following specification.

In one embodiment, a method of using a complementary filter is provided. The method includes integrating an acceleration estimate to determine an integrated acceleration estimate. Subtracting a GPS velocity from the integrated acceleration estimate to determine a velocity noise error. Filtering the velocity noise error and adding the filtered velocity noise error to the integrated acceleration estimate to obtain a velocity estimate.

In another embodiment, a method of determining a position estimate of an object is provided. The method comprises integrating an acceleration estimate in each of three dimensions to determine an integrated acceleration estimate for each of the dimensions. Subtracting a GPS velocity in each of the dimensions from the integrated acceleration estimate for each of the dimensions to determine a velocity noise error in each dimension. Filtering the velocity noise error in each dimension. Adding the filtered velocity noise error to the integrated acceleration estimate in each dimension to obtain a velocity estimate in each dimension. Integrating the velocity estimate in each dimension to determine an integrated velocity estimate in each dimension. Subtracting a GPS position in each dimension from the integrated velocity estimate in each dimension to determine a position noise error in each dimension. Filtering the position noise error in each dimension and adding the filtered position noise error in each dimension to the integrated velocity estimate to obtain a position estimate in each dimension.

In yet another embodiment, a machine readable medium having instructions stored thereon for generating a position estimate of an object in three dimensions is provided. The method of the machine readable instructions for each dimension includes integrating an acceleration estimate to determine an integrated acceleration estimate. Subtracting a GPS velocity from the integrated acceleration estimate to determine a velocity noise error. Filtering the velocity noise error. Adding the filtered velocity noise error to the integrated acceleration estimate to obtain a velocity estimate. Integrating the velocity estimate to determine a position. Subtracting a GPS position from the integrated velocity estimate to determine a position noise error. Filtering the position noise error and adding the filtered position noise error to the integrated velocity estimate to obtain a position estimate.

In still another embodiment, a position determining device to estimate the position of an object in three dimensions is provided. The determination of the position estimate in each dimension includes a means to determine an acceleration estimate. A means of integrating the acceleration estimate to determine an integrated acceleration estimate. A means of subtracting a GPS velocity from the integrated acceleration estimate to determine a velocity noise error. A means of filtering the velocity noise error. A means of adding the filtered velocity noise error to the integrated acceleration estimate to obtain a velocity estimate. A means of integrating the velocity estimate to determine an integrated velocity estimate. A means of subtracting a GPS position from the integrated velocity estimate to determine a position noise error. A means of filtering the position noise error and a means of adding the filtered position noise error to the integrated velocity estimate to obtain a position estimate.

In still yet another embodiment, a complementary filter position determining device is provided. The device includes a first filter circuit and a second filter circuit. The first filter circuit includes a first integrator, a first subtractor, a first low pass filter and a first adder. The first integrator is adapted to integrate an acceleration estimate to determine an integrated acceleration. The first subtractor is adapted to subtract a GPS velocity from the determined integrated acceleration estimate to determine a velocity noise error. The first low pass filter is adapted to filter the velocity noise error and the adder is adapted to add the filtered velocity noise error to the integrated acceleration estimate to determine a velocity estimate. The second filter circuit includes a second integrator, a second subtractor, a second low pass filter and a second adder. The second integrator is adapted to integrate the velocity estimate to determine an integrated velocity estimate. The second subtractor is adapted to subtract a GPS position from the determined integrated velocity estimate to determine a position noise error. The second low pass filter adapted to filter the position noise error and the second adder is adapted to add the filtered position noise error to the integrated velocity estimate to determine a position estimate.

In finally still another embodiment, a position estimate system is provided the position estimate system includes an acceleration determining function, an x filter circuit, a y filter circuit and a z filter circuit. The acceleration determining function is adapted to determine an acceleration estimate of an object in a first, second and third dimension. The x filter circuit is adapted to determine a position estimate in the first dimension based at least in part on the acceleration estimate in the first dimension and a GPS acceleration in the first dimension. The y filter circuit is adapted to determine a position estimate in the second dimension based at least in part on the acceleration estimate in the second dimension and a GPS acceleration in the second dimension and the z filter circuit adapted to determine a position estimate in the third dimension based at least in part on the acceleration estimate in the third dimension and a GPS acceleration in the third dimension.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a navigation system that estimates the position of an object in a fast and efficient manner. In particular, in embodiments of the present invention, a complementary filter system is used to determine the position of the object. The complementary filter system provides a relatively simple system that requires relatively less processing power than a typical Kalman filter system. This provides benefits over a typical Kalman filter system such as less software to code, less software to test, smaller on board processor required, less weight, and less power used.

Figure 1:
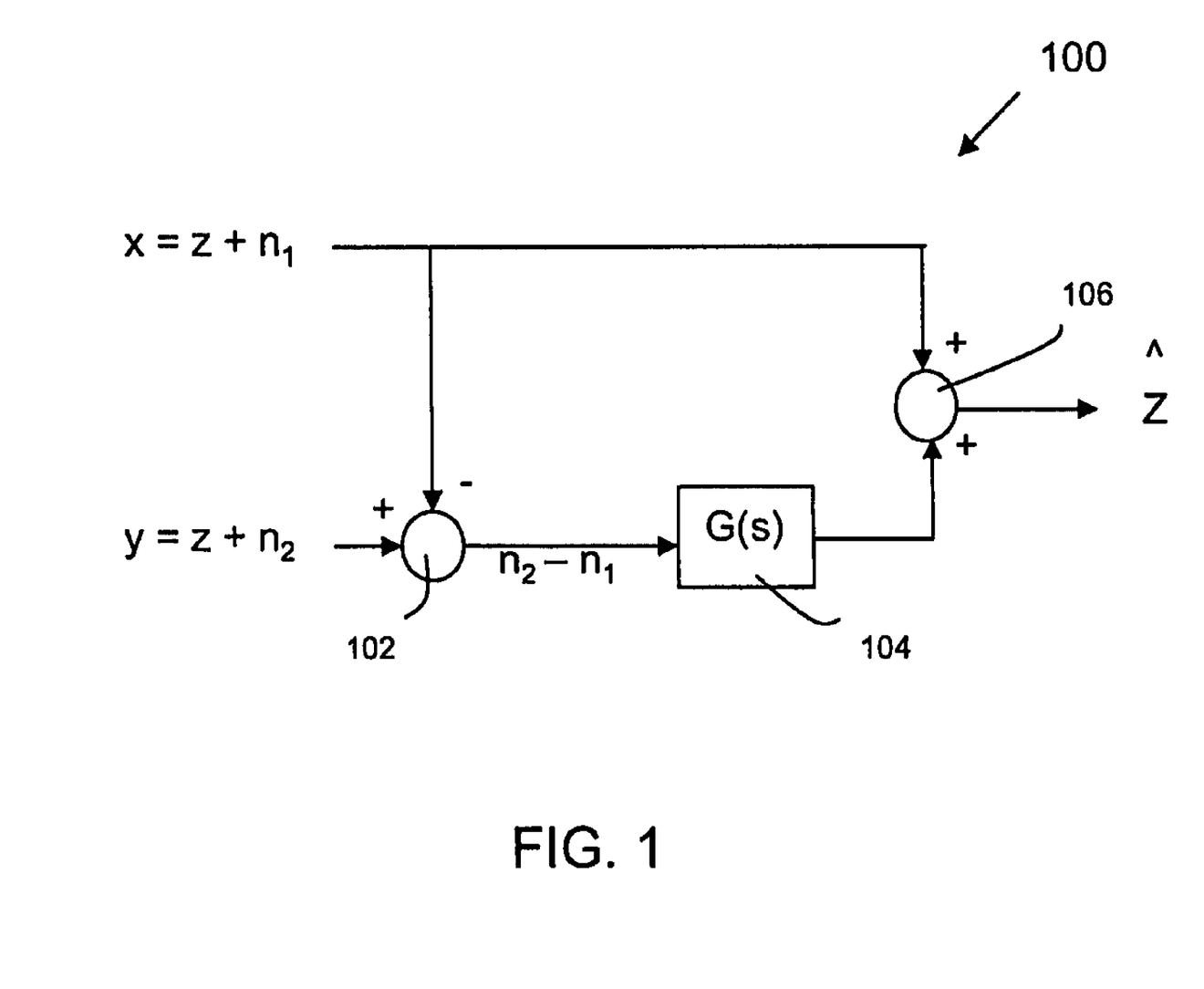
FIG. 1 is a block diagram of a complementary filter structure used in one embodiment of the present invention.

Referring to FIG. 1, a complementary filter scheme 100 of the prior art is illustrated to provide further background information. In FIG. 1, the complementary filter scheme is used to determine an estimate of variable $Z\hat{}$ from two relatively noisy signals x and y. In FIG. 1, two signals, $x=z+n_1$ and $y=z+n_2$ are introduced to the complementary filter scheme 100. The signals $x=z+n_1$ and $y=z+n_2$, measure the same variable z. However, the x measurement is accurate for high frequencies and the y measurement is accurate for low frequencies. Variables $n_1$ and $n_2$ represent the noise in the first and second signals. As illustrated in FIG. 1, signals x and y are subtracted by subtractor 102 to produce noise error $n_2-n_1$. The noise error is then filtered through filter 104. The filtered noise error is then added to the z signal to produce the estimated variable $Z\hat{}$.

Figure 2:
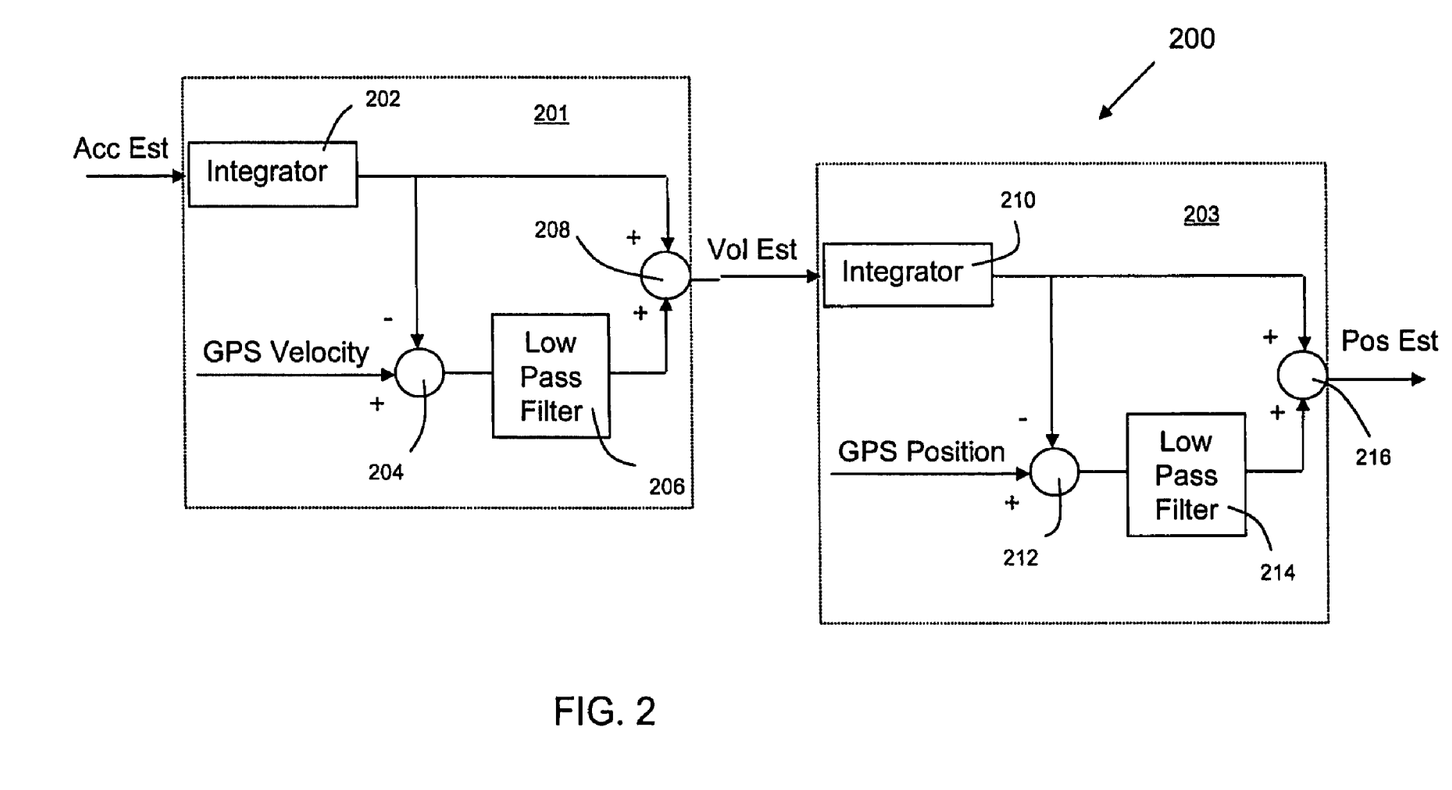
FIG. 2 is a block diagram of a position determining device of one embodiment of the present invention.

FIG. 2 illustrates a position determining device 200 that includes two cascaded complementary filters of one embodiment of the present invention. As illustrated, the position determining device 200 includes a velocity estimator 201/first filter circuit and a position estimator 203/second filter circuit. The velocity estimator 201/first filter circuit includes a velocity (or first) integrator 202 that integrates an acceleration estimate into a velocity (or integrated acceleration estimate). A velocity subtractor 204 is used to subtract the integrated acceleration estimate from a GPS velocity to obtain a velocity noise error. A velocity low pass filter 206 is used to filter the velocity noise error. A velocity adder 208 is used to add the filtered velocity noise to the integrated acceleration estimate to obtain a velocity estimate.

The velocity estimate is used by the position estimator 203/second filter circuit to determine position. The position estimator 203/second filter circuit includes a position (or second) integrator 210. The position integrator 210 integrates the velocity estimate into a position (or integrated velocity estimate). A position subtractor 212 is used to subtract the integrated velocity estimate from a GPS position to determine the position noise error. A position low pass filter 214 filters the position noise error. A position adder 216 is used to add the position noise error to the integrated velocity estimate to determine the position estimate. In embodiments of the present invention, position estimate is determined for each of the three dimensions.

Figure 3:
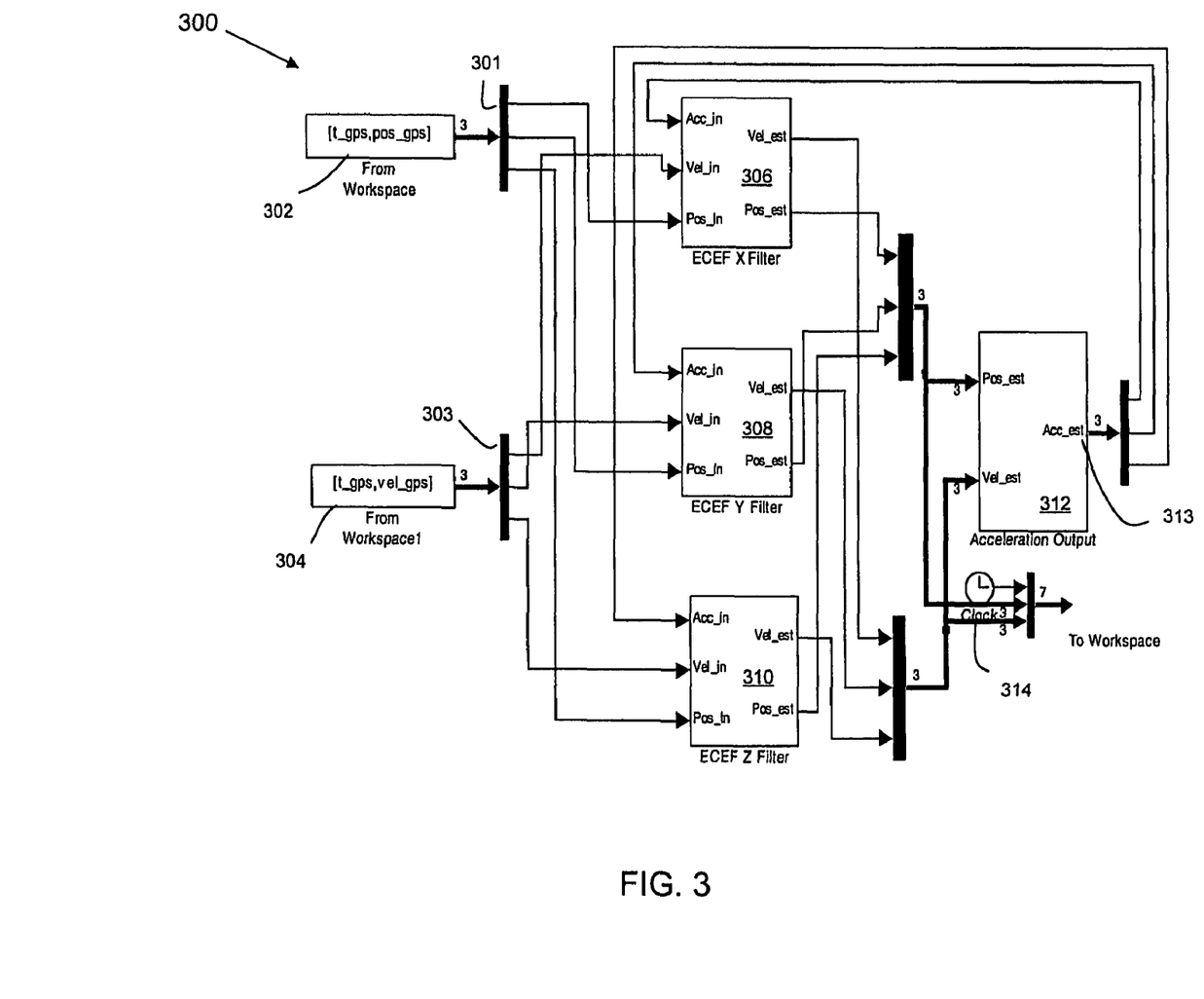
FIG. 3 is a top level sumulink block diagram of one embodiment of the present invention.

FIG. 3 is a top level sumulink block diagram of a position determining device 300 of one embodiment of the present invention. The positioning determining device 300 includes an acceleration output 312, a X filter circuit 306, a Y filter circuit 308 and a Z filter circuit 310. The acceleration output 312 includes an acceleration function that provides an acceleration estimate in the x, y and z dimensions at output 311. As illustrated in FIG. 3, the acceleration estimate from the acceleration output 312 in this embodiment is based at least in part on the position and velocity estimates provided from the respective X, Y and Z filters 306, 308 and 310. GPS position data is routed to X, Y, Z filters 306, 308, and 310 via router 301. Similarly, GPS velocity data is routed to X, Y, Z filters 306, 308, and 310 via router 303. GPS position 302 and GPS velocity 304 signals are inputs to the position determining device 300. Each X, Y, Z filter 306, 308 and 310 determines a velocity estimate and position estimate for its respective dimension. A clock circuit 314 is used as a time reference to output the determined velocity and position estimates in each dimension.

Figure 4:
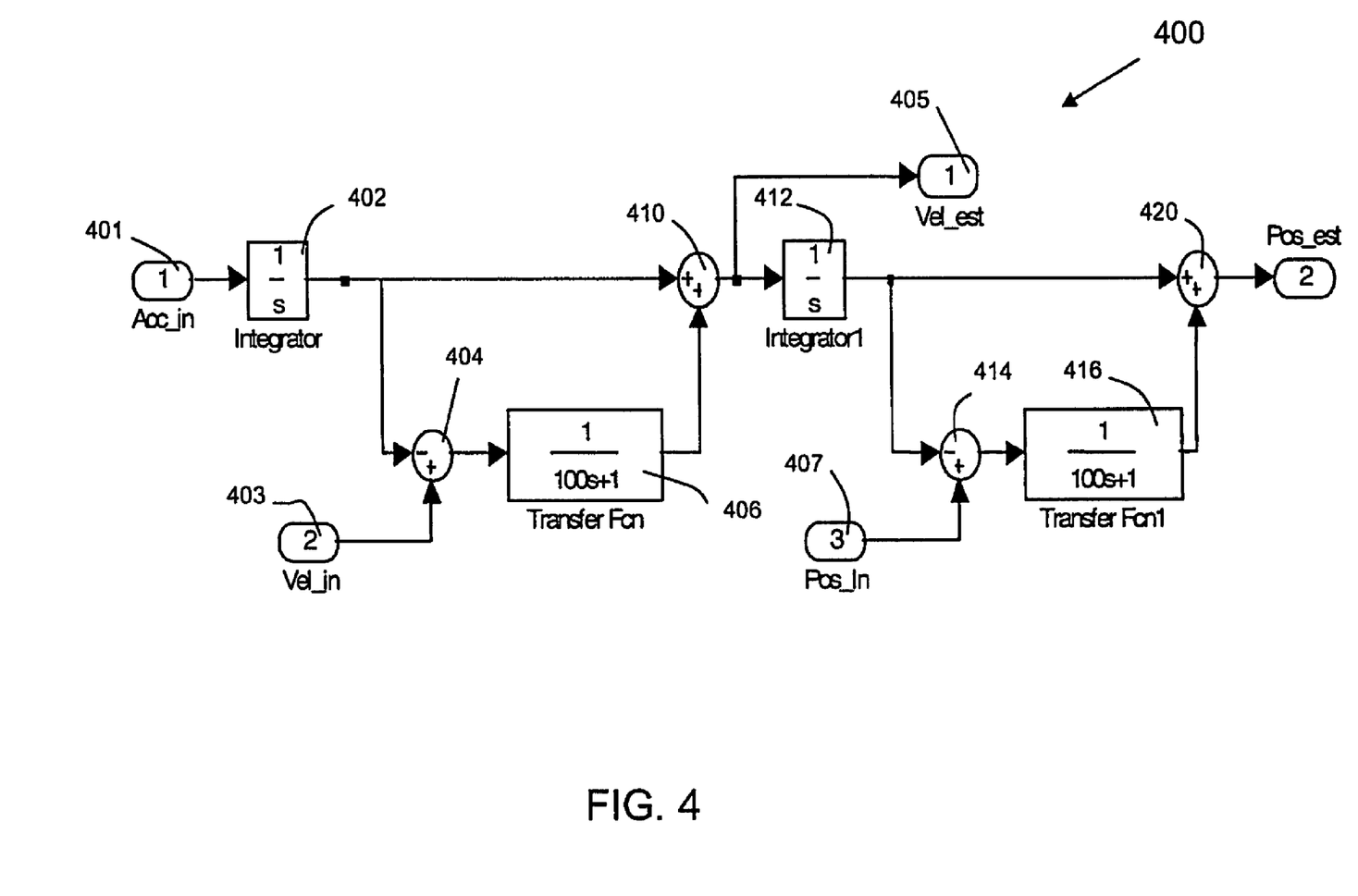
FIG. 4 is a flow diagram of cascaded complementary filters of one embodiment of the present invention.

A flow diagram 400 of the implementation of a position determining device, similar to that illustrated in FIG. 2, of one embodiment of the present invention is illustrated in FIG. 4. Flow diagram 400 illustrates the determination of a position estimate in a single dimension. In embodiments of the present invention the steps set out in flow diagram 400 are repeated in each dimension to determine the position estimate in three dimensions. Referring to the flow diagram 400 of FIG. 4, the process starts by supplying a first integrator with an acceleration estimate (401). The first integrator integrates the acceleration estimate to determine a velocity (or integrated acceleration) (402). The integrated acceleration is supplied to a velocity subtractor and a velocity adder. A GPS velocity is also supplied to the velocity subtractor (403). The velocity subtractor subtracts the integrated acceleration from the GPS velocity (404). The velocity subtractor determines a velocity noise error that is then filtered (406). The filtered velocity noise error is then added to the integrated acceleration by the velocity adder to determine a velocity estimate (410). The velocity estimate can then be outputted for use (405).

The velocity estimate is also integrated with a second integrator to determine a position (or integrated velocity estimate) (412). The integrated velocity estimate is supplied to a position subtractor and a position adder. A GPS position is also supplied to the position subtractor (407). The position subtractor subtracts the integrated velocity estimate from the GPS position to determine a position noise error (414). The position noise error is then filtered (416). The position adder then adds the integrated velocity estimate to the filtered noise error to determine the position estimate (420). The position estimate is then outputted (409).

Figure 5:
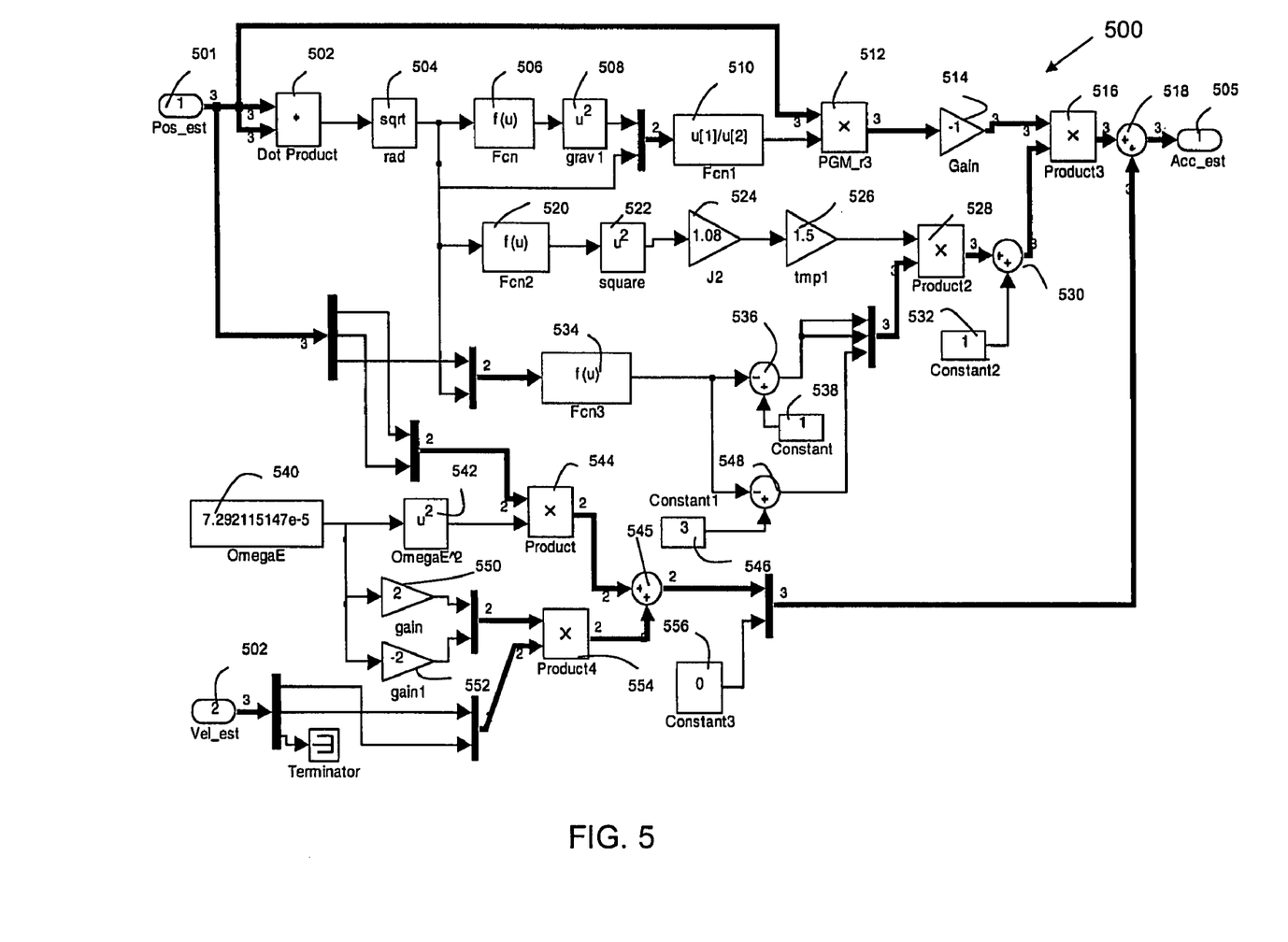
FIG. 5 in a flow diagram of an orbital acceleration estimator of one embodiment of the present invention.

As described above, the position determining devices of the present invention use an acceleration estimate that is input in to the device. An example of an acceleration estimate that can be used in embodiments of the present invention is provided below in Equation 1. Equation 1 estimates the acceleration of a vehicle in space such as a vehicle in orbit of the earth.

$$\begin{bmatrix}\hat{a}_x\\\hat{a}_y\\\hat{a}_z\end{bmatrix} = \begin{pmatrix}\frac{\mu}{R^3}\left[1+\frac{3}{2}J_2\left(\frac{R_e}{R}\right)^2\left(1-5\left(\frac{\hat{z}}{R}\right)^2\right)\right]\hat{x}+\Omega_e^2\hat{x}+2\Omega_e\hat{v}_y\\\frac{\mu}{R^3}\left[1+\frac{3}{2}J_2\left(\frac{R_e}{R}\right)^2\left(1-5\left(\frac{\hat{z}}{R}\right)^2\right)\right]\hat{y}+\Omega_e^2\hat{y}+2\Omega_e\hat{v}_x\\\frac{\mu}{R^3}\left[1+\frac{3}{2}J_2\left(\frac{R_e}{R}\right)^2\left(3-5\left(\frac{\hat{z}}{R}\right)^2\right)\right]\hat{z}\end{pmatrix}$$ Equation 1

Where $R=\sqrt{\hat{x}^2+\hat{y}^2+\hat{z}^2}$
and $[\hat{x}, \hat{y}, \hat{z}]$=estimated ecef position
$[\hat{v}_x, \hat{v}_x, \hat{v}_z]$=estimated ecef velocity
$[\hat{a}_x, \hat{a}_y, \hat{a}_z]$=estimated ecef acceleration In equation 1, R is the radial distance from the vehicle to the center of the earth, $R_e$ (6378.137 km) is the equatorial radius of the earth, $\mu$ is the gravitation constant (0.3986×10$^6$ km$^2$/sec$^2$), $\Omega_e$ (7.292115147×10$^{-5}$ rad/sec) is the rotation rate of the earth and $J_2$ (1.0826299×10$^{-3}$) is the zonal harmonics that describe the earth's gravity. FIG. 5 illustrates a flow diagram 500 of the implementation equation 1 to determine the orbital acceleration estimates for the three dimensions.

As illustrated in FIG. 5, position estimates in each dimension are provided at block (501). R is inverted and multiplied by the square root of gravity constant $\mu$ to form the term $\sqrt{\mu}/R$. The term $\sqrt{\mu}/R$ is squared in block (508) to form the term $\mu/R^2$ which is divided by R in block (510) to form $\mu/R^3$. The position estimate vector $$\begin{bmatrix}\hat{x}\\\hat{y}\\\hat{z}\end{bmatrix}$$

is multiplied by the output of block (510) to form $$\frac{\mu}{R^3}\begin{bmatrix}\hat{x}\\\hat{y}\\\hat{z}\end{bmatrix}$$

which is then negated by block (514) to form $$-\frac{\mu}{R^3}\begin{bmatrix}\hat{x}\\\hat{y}\\\hat{z}\end{bmatrix}.$$

R is inverted and multiplied by the radius of the earth $R_e$ in block (520) to form $R_e/R$ which is then squared by block (522) to form $R_e^2/R^2$. The output of block (522) is multiplied by $J_2$ (524) and then multiplied by 1.5 (526) to form the term $$1.5J_2\frac{R_e^2}{R^2}.$$

The z component of the position estimate $\hat{z}$ is divided by R the result of which is squared and multiplied by 5 in block (534) to form $$5\left(\frac{\hat{z}}{R}\right)^2.$$

In block (548) the output of block 534 is subtracted from 3 (546) to form $$3-5\left(\frac{\hat{z}}{R}\right)^2.$$

In block (536) the output of block (534) is subtracted from 1 (538) to form $$1-5\left(\frac{\hat{z}}{R}\right)^2.$$

The outputs of block 536 and 548 are put into vector form and multiplied by the output of block (536) and (548) are put into vector form and multiplied (528) by the output of block (526) to form $$1.5J_2\frac{R_e^2}{R^2}\begin{bmatrix}1-5\left(\frac{\hat{z}}{R}\right)^2\\1-5\left(\frac{\hat{z}}{R}\right)^2\\3-5\left(\frac{\hat{z}}{R}\right)^2\end{bmatrix}.$$

The output of block (528) is summed (530) with 1 (532) to form the vector $$\begin{bmatrix} 1 + 1.5 J_2 \frac{R_e^2}{R^2}\left(1 - 5\left(\frac{\hat{z}}{R}\right)^2\right) \\ 1 + 1.5 J_2 \frac{R_e^2}{R^2}\left(1 - 5\left(\frac{\hat{z}}{R}\right)^2\right) \\ 1 + 1.5 J_2 \frac{R_e^2}{R^2}\left(3 - 5\left(\frac{\hat{z}}{R}\right)^2\right) \end{bmatrix}.$$

The output of (514) is multiplied (516) by the output of (530) to form the vector $$\begin{bmatrix} -\frac{\mu}{R^3}\hat{x}\left[1 + 1.5 J_2 \frac{R_e^2}{R^2}\left(1 - 5\left(\frac{\hat{z}}{R}\right)^2\right)\right] \\ -\frac{\mu}{R^3}\hat{y}\left[1 + 1.5 J_2 \frac{R_e^2}{R^2}\left(1 - 5\left(\frac{\hat{z}}{R}\right)^2\right)\right] \\ -\frac{\mu}{R^3}\hat{z}\left[1 + 1.5 J_2 \frac{R_e^2}{R^2}\left(3 - 5\left(\frac{\hat{z}}{R}\right)^2\right)\right] \end{bmatrix}.$$

$\Omega_e$ at block (540) is squared at (542) and multiplied (544) by the x and y components of the position estimate (501) to form the terms $\Omega_e^2 \hat{x}$ and $\Omega_e^2 \hat{y}$. $\Omega_e$ at block (540) is also multiplied by 2 (55) and −2 (552) to form the terms $2\Omega_e$ and $-2\Omega_e$ respectively. The outputs of (550) and (552) are multiplied (554) by the y and z components of the velocity estimate (502) to form the terms $2\Omega_e \hat{v}_y$ and $2\Omega_e \hat{v}_x$. The outputs of (544) and (554) are summed together (545) and along with the 0 output of (556) are used to form the vector $$\begin{bmatrix} \Omega_e^2 \hat{x} + 2\Omega_e \hat{v}_y \\ \Omega_e^2 \hat{y} - 2\Omega_e \hat{v}_z \\ 0 \end{bmatrix}$$

which is input to (518). The inputs to (518) are summed to form the acceleration estimate (505) defined by equation 1.

Figure 6A:
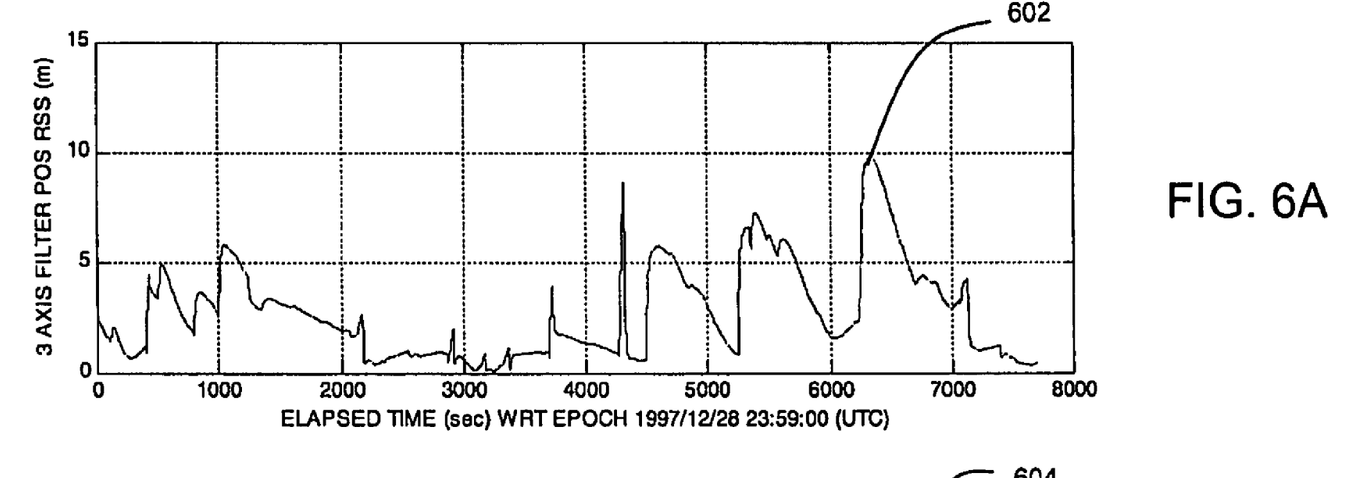
FIGS. 6A through 6D are plots illustrating the filter performance at a rate of 10 seconds of one embodiment of the present invention.
Figure 6B:
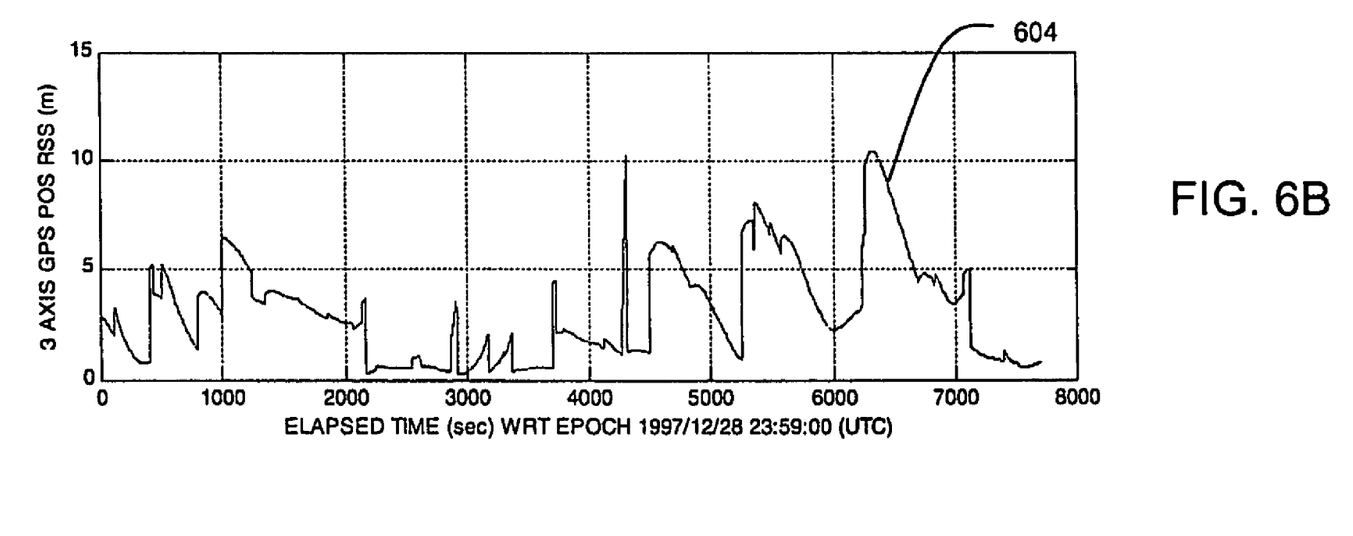
Figure 6C:
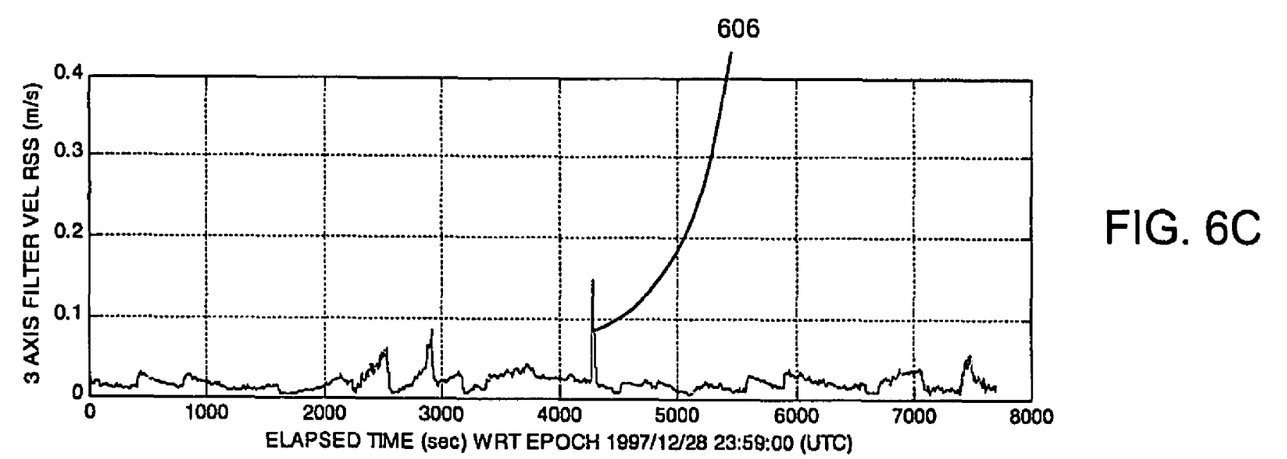
Figure 6D:
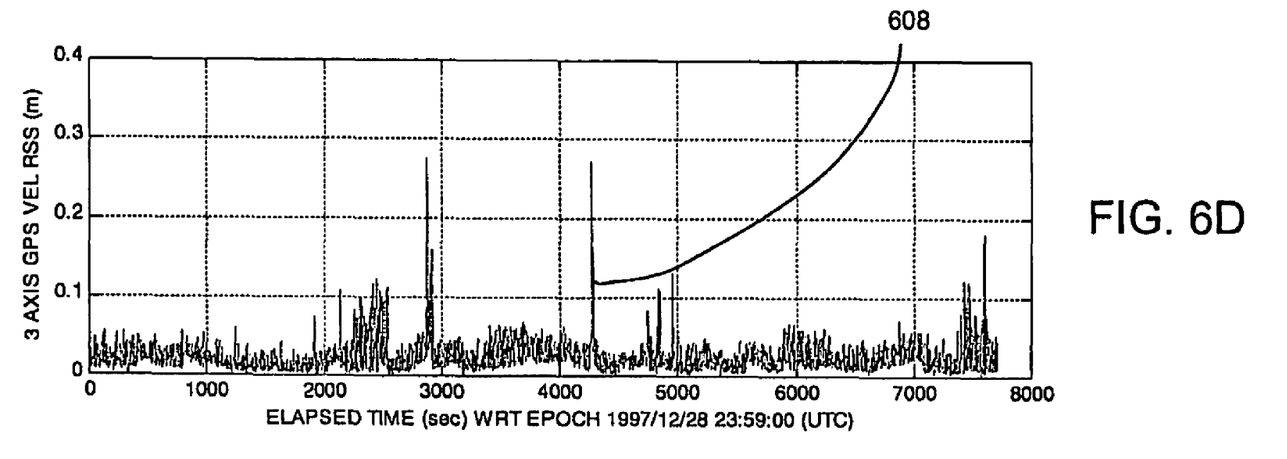

The filter rate used in embodiments of the present invention to filter the velocity noise error and the position noise error will affect the performance of the position determining devices of embodiments of the present invention. For example, referring to FIGS. 6A though 6D an example of the use of a lightly filtered position and velocity noise error signals are provided. In this example, the signals are filtered with a time constant of 10 seconds. In particular, FIG. 6A illustrates a plot of a position error in a position estimate signal 602 over a period of time. As illustrated, a 10 meter error occurs at one point. This is not much of an improvement over the GPS positioning signal error 604 illustrated in the plot of FIG. 6B. In FIG. 6C, a plot illustrating a velocity estimate signal over a period of time 606 is provided. As illustrated, with the 10 second time constant, a maximum error of about 1.5 meters per second is recorded. Comparing this to the GPS velocity signal error 608 on the plot illustrated FIG. 6D, an improvement is realized. A maximum GPS signal error 608 is recorded at about 0.29 meters per second.

Figure 7A:
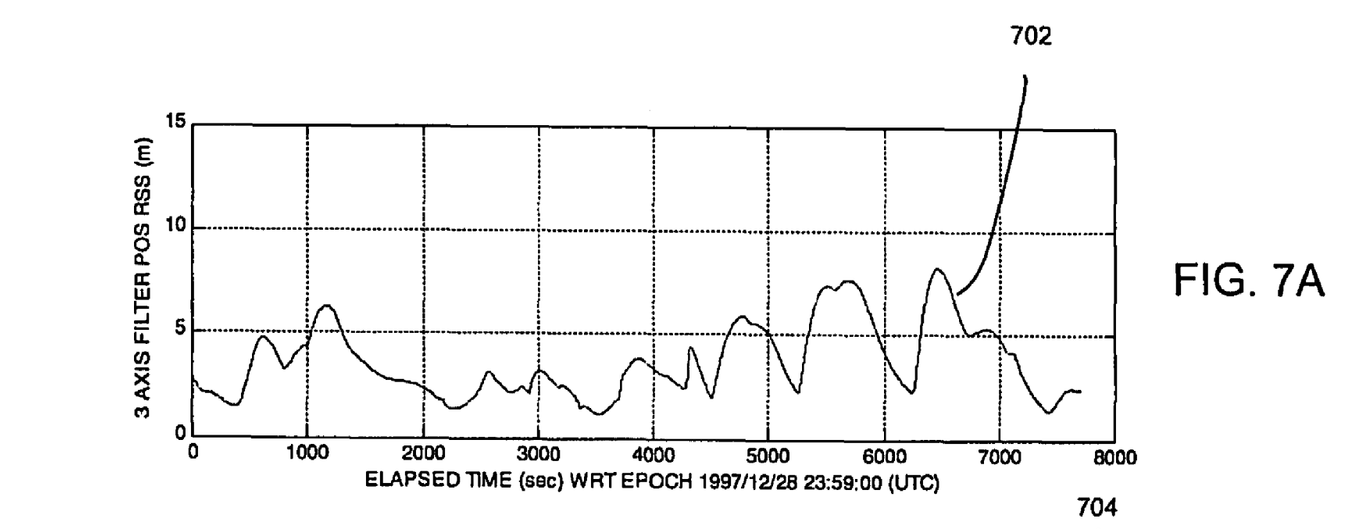
FIGS. 7A through 7D are plots illustrating the filter performance at a rate of 100 seconds of one embodiment of the present invention.
Figure 7B:
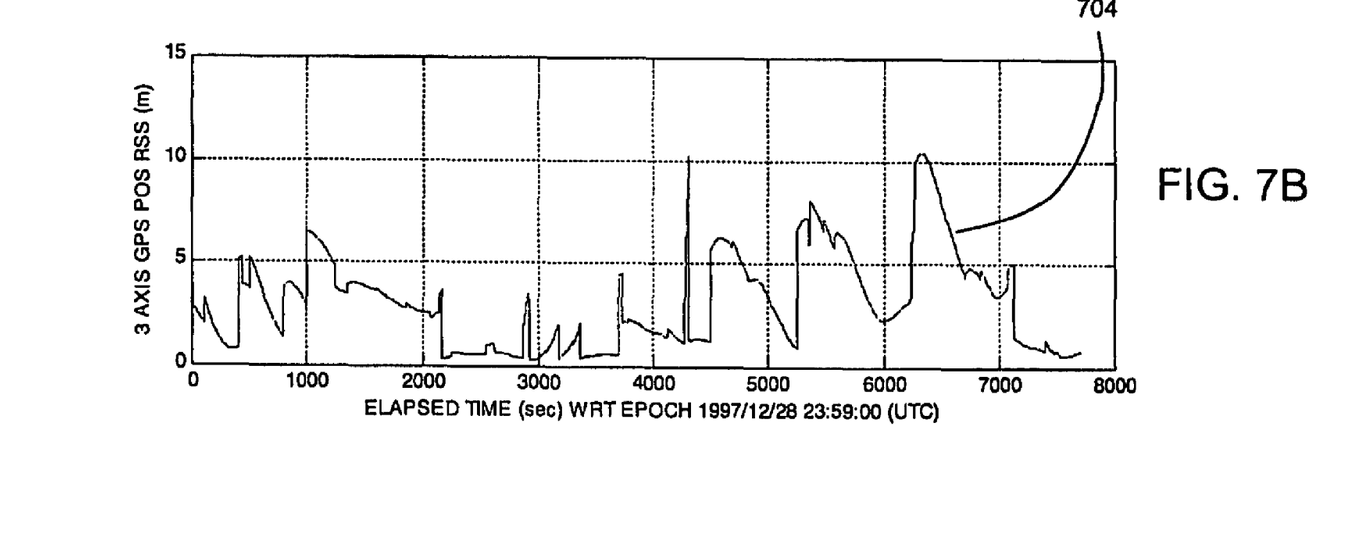
Figure 7C:
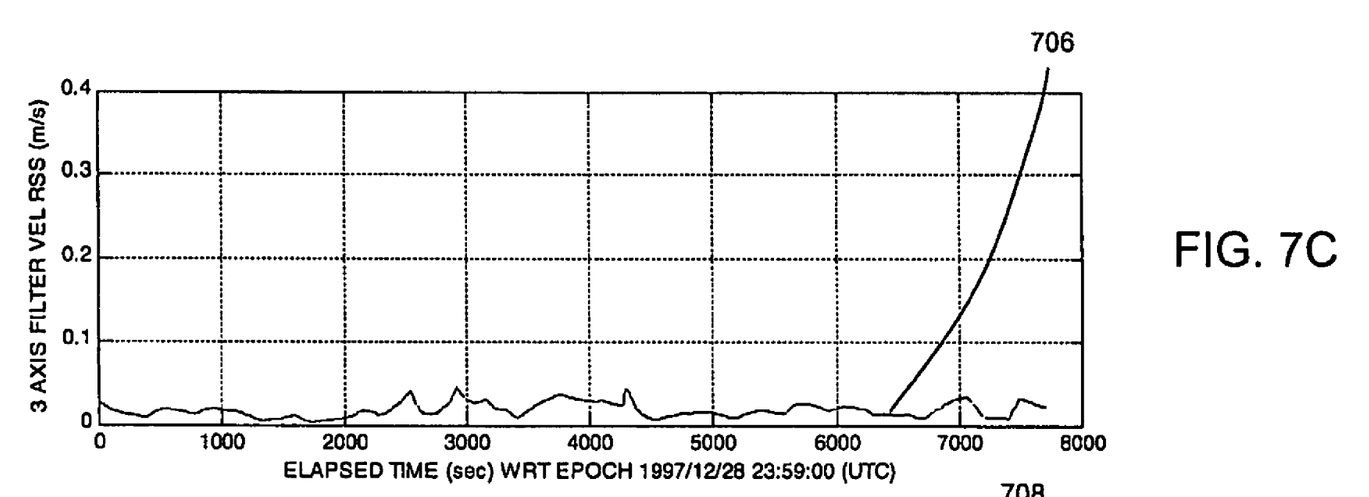
Figure 7D:
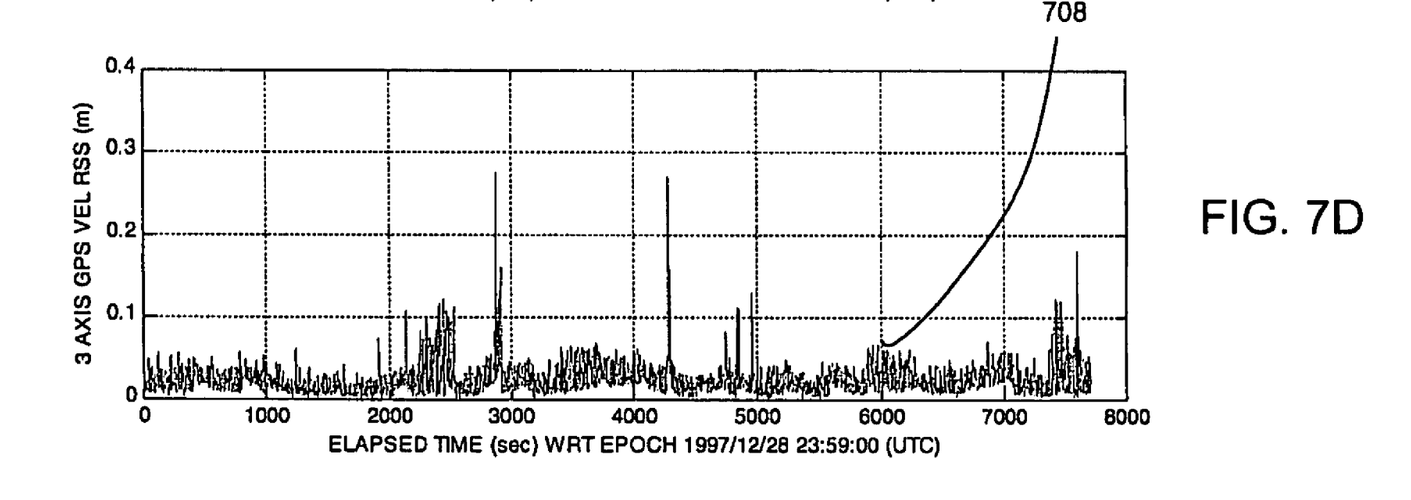

FIGS. 7A through 7D illustrate the impact of medium filtering the respective signals. In particular, in this embodiment the signals are filtered with a time constant of 100 seconds. As illustrated in FIG. 7A, the position estimate signal 702 has a maximum error of about 7.6 meters. In comparison, the GPS position signal 704 has a maximum error of about 10.1 meters. Accordingly, a substantial improvement over the GPS position signal is realized. Referring to FIG. 7C the velocity estimate signal 705 in this plot is very low. In particular, a maximum error of about 0.05 meters per second is recorded. Comparing this to maximum recorded error in the GPS velocity error signal 708 on the plot in FIG. 7D, a great improvement is realized. In particular, an error of approximately 0.29 is recorded in the GPS velocity error signal 708 of FIG. 7D.

Figure 8A:
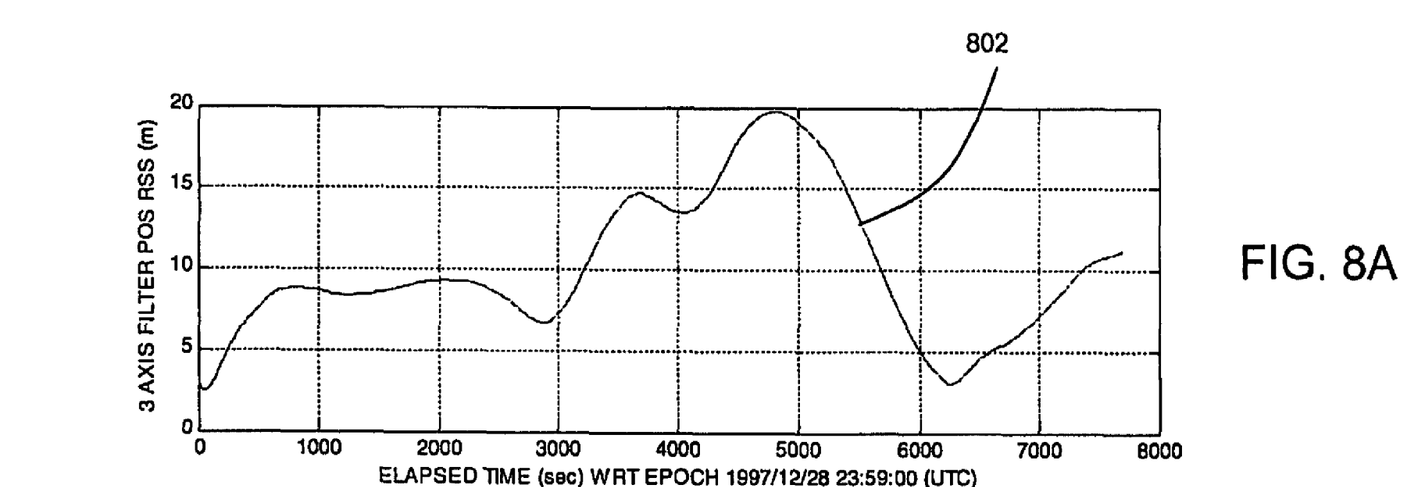
FIGS. 8A through 8D are plots illustrating the filter performance at a rate of 1000 seconds of one embodiment of the present invention.
Figure 8B:
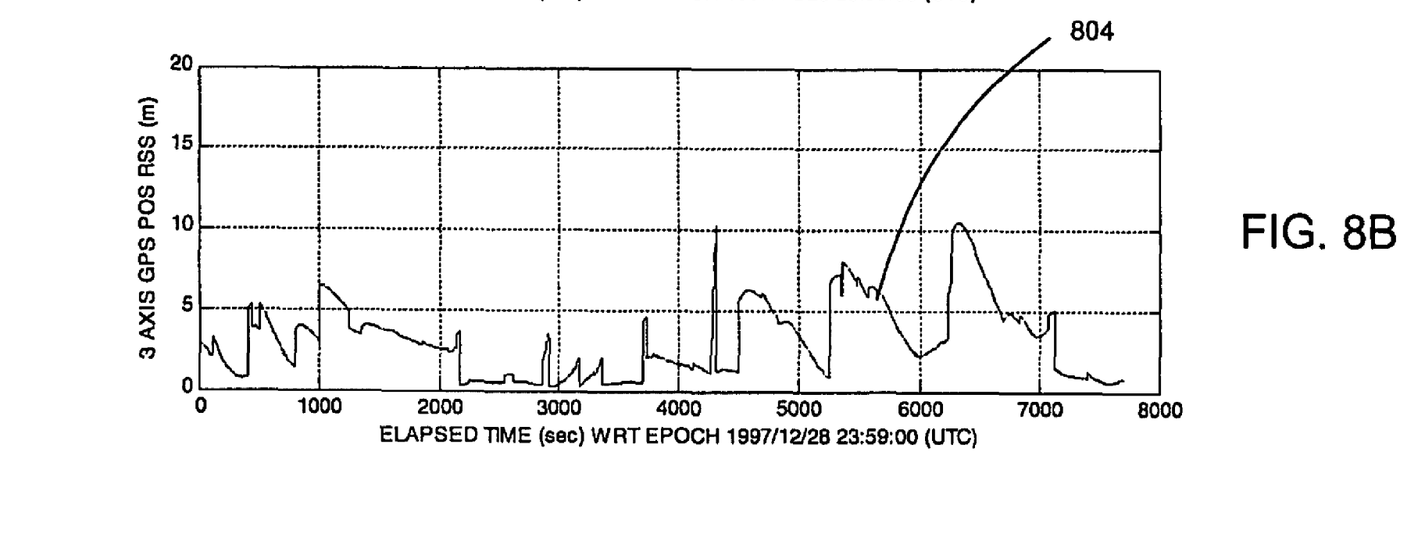
Figure 8C:
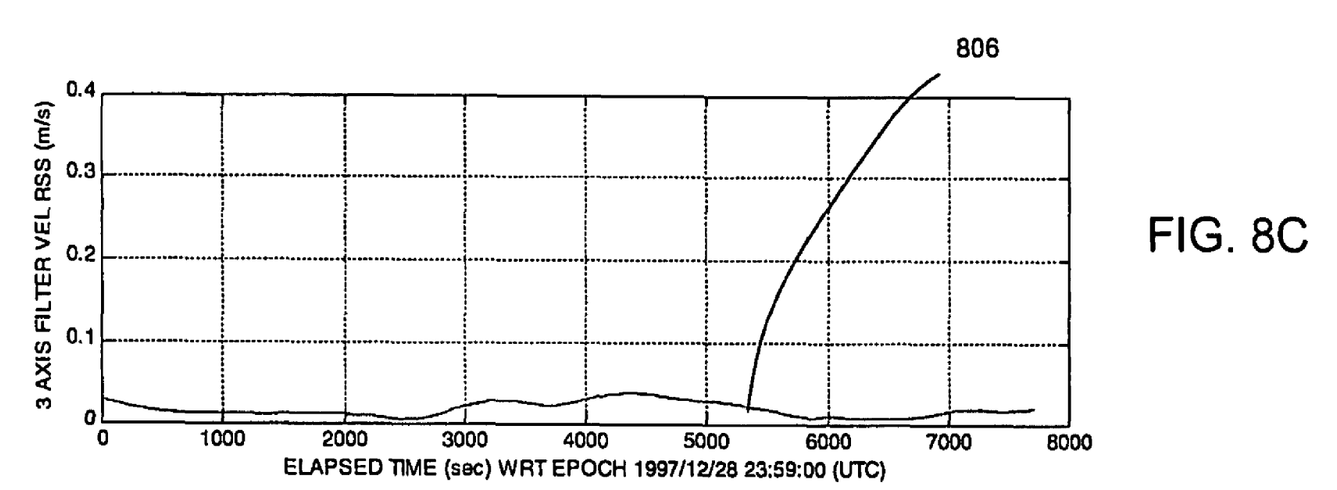
Figure 8D:
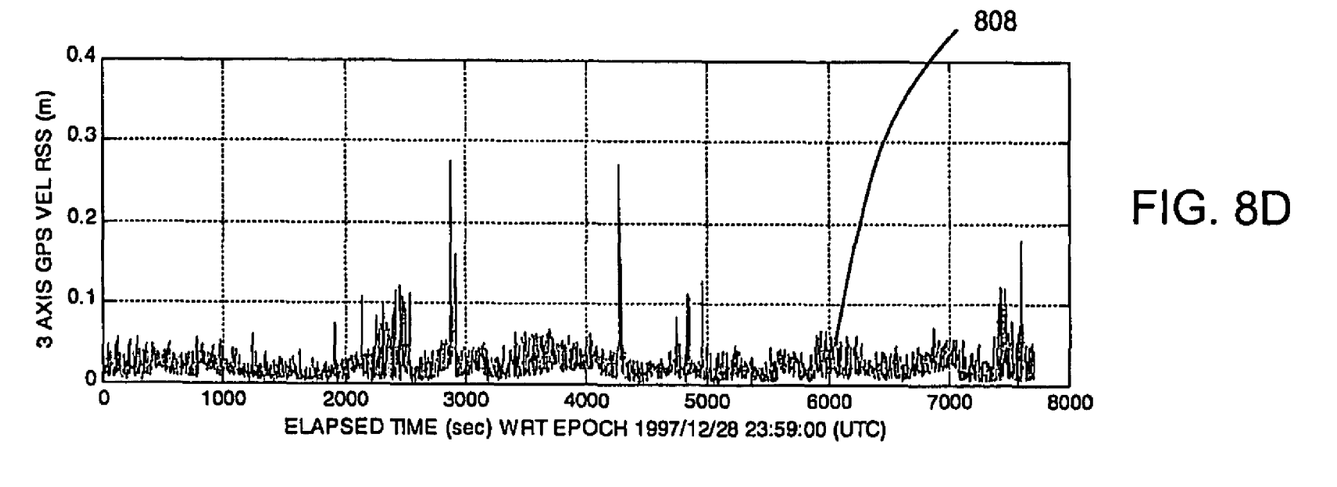

FIGS. 8A through 8D illustrate the impact of heavily filtering the respective signals. In particular, in this embodiment the signals are filtered with a time constant of 1000 seconds. As illustrated in FIG. 8A, the position estimate signal 802 has a maximum error of about 20 meters. In comparison, the GPS position signal 804 has a maximum error of about 10.1 meters. Accordingly, the GPS position signal is more accurate than the position estimate signal when the position noise error is filtered at this rate. Referring to FIG. 8C the velocity estimate signal 806 in this plot is still very low. In particular, a maximum error of about 0.04 meters per second is recorded. Comparing this to maximum recorded error in the GPS velocity error signal 708 on the plot in FIG. 7D, a great improvement in velocity accuracy is realized. In particular, an error of approximately 0.29 is recorded in the GPS velocity error signal 708 of FIG. 7D. However, because of the poor performance of the positing estimate, filtering with a time constant of 1000 seconds would not be desired for determining position estimates. Accordingly, embodiments of the present invention apply filtering rates designed to optimize the accuracy of the desired output.

Embodiments of devices that make up the navigation systems of the present invention may be implemented in digital electronic circuitry, or with a programmable processor (for example, a special-purpose processor or a general-purpose process such as a computer firmware, software, or in combinations of them). Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of determining a position estimate of an object, the method comprising:
    integrating an acceleration estimate to determine an integrated acceleration estimate;
    subtracting a GPS velocity from the integrated acceleration estimate to determine a velocity noise error;
    filtering the velocity noise error;
    adding the filtered velocity noise error to the integrated acceleration estimate within a first filter circuit to obtain a velocity estimate;
    integrating the velocity estimate to determine an integrated velocity estimate;
    subtracting a GPS position from the integrated velocity estimate to determine a position noise error;
    filtering the position noise error; and
    adding the filtered position noise error to the integrated velocity estimate within a second filter circuit to obtain a position estimate.

2. The method of claim 1, further comprising:
    determining the acceleration estimate.

3. The method of claim 1, wherein filtering the velocity noise error further comprises:
    filtering the velocity noise error at a select time constant based on a desired output.

4. The method of claim 1, further comprising:
    determining the position estimate in three dimensions.

5. The method of claim 1, wherein filtering the position noise error further comprises:
    filtering the position noise error at a time constant based on a desired output.

6. A method of determining a position estimate of an object, the method comprising:
    providing at least one processor configured to execute instructions to perform a process of generating a position estimate of an object in three dimensions, the process comprising:
        integrating an acceleration estimate in each of three dimensions to determine an integrated acceleration estimate for each of the dimensions;
        subtracting a GPS velocity in each of the dimensions from the integrated acceleration estimate for each of the dimensions to determine a velocity noise error in each dimension;
        filtering the velocity noise error in each dimension;
        adding the filtered velocity noise error to the integrated acceleration estimate in each dimension to obtain a velocity estimate in each dimension;
        integrating the velocity estimate in each dimension to determine an integrated velocity estimate in each dimension;
        subtracting a GPS position in each dimension from the integrated velocity estimate in each dimension to determine a position noise error in each dimension;
        filtering the position noise error in each dimension; and
        adding the filtered position noise error in each dimension to the integrated velocity estimate to obtain a position estimate in each dimension.

7. The method of claim 6, further comprising:
    determining the acceleration estimate in each of the three dimensions.

8. A non-transitory machine readable medium having instructions stored thereon executable by a processor to perform a method of generating a position estimate of an object, the method comprising:
    integrating an acceleration estimate to determine an integrated acceleration estimate;
    subtracting a GPS velocity from the integrated acceleration estimate to determine a velocity noise error;
    filtering the velocity noise error;
    adding the filtered velocity noise error to the integrated acceleration estimate to obtain a velocity estimate;
    integrating the velocity estimate to determine a position;
    subtracting a GPS position from the integrated velocity estimate to determine a position noise error;
    filtering the position noise error; and
    adding the filtered position noise error to the integrated velocity estimate to obtain a position estimate.

9. The non-transitory machine readable instructions of claim 8 further comprising:
    generating the acceleration estimate with an orbital acceleration equation.

10. A position determining device to estimate the position of an object in three dimensions, comprising:
    means for determining an acceleration estimate;
    means for integrating the acceleration estimate to determine an integrated acceleration estimate;
    means for subtracting a GPS velocity from the integrated acceleration estimate to determine a velocity noise error;
    means for filtering the velocity noise error;
    means for adding the filtered velocity noise error to the integrated acceleration estimate to obtain a velocity estimate;
    means for integrating the velocity estimate to determine an integrated velocity estimate;
    means for subtracting a GPS position from the integrated velocity estimate to determine a position noise error;
    means for filtering the position noise error; and
    means for adding the filtered position noise error to the integrated velocity estimate to obtain a position estimate.

11. A position determining device for determining a position of an object, the device comprising:
    a first filter circuit including,
        a first integrator adapted to integrate an acceleration estimate to determine an integrated acceleration,
        a first subtractor adapted to subtract a GPS velocity from the determined integrated acceleration estimate to determine a velocity noise error,
        a first low pass filter adapted to filter the velocity noise error,
        a first adder adapted to add the filtered velocity noise error to the integrated acceleration estimate to determine a velocity estimate; and
    a second filter circuit including,
        a second integrator adapted to integrate the velocity estimate to determine an integrated velocity estimate,
        a second subtractor adapted to subtract a GPS position from the determined integrated velocity estimate to determine a position noise error,
        a second low pass filter adapted to filter the position noise error, and
        a second adder adapted to add the filtered position noise error to the integrated velocity estimate to determine a position estimate.

12. The device of claim 11, further comprising:
    a clock adapted to provide a time reference for outputs of the device.

13. The device of claim 11, further comprising:
a GPS position input router adapted to receive the GPS position; and
a GPS velocity input router adapted to receive the GPS velocity.

14. The device of claim 11, further comprising:
an acceleration output adapted to provide the acceleration estimate to the first integrator.

15. The device of claim 14, wherein the acceleration output further comprises:
an orbital acceleration equation function adapted to determine the acceleration of a vehicle in orbit in three dimensions.

* * * * *